(12) United States Patent
Frias et al.

(10) Patent No.: US 11,216,059 B2
(45) Date of Patent: Jan. 4, 2022

(54) DYNAMIC TIERING OF DATACENTER POWER FOR WORKLOADS

(71) Applicant: Virtual Power Systems, Inc., Milpitas, CA (US)

(72) Inventors: Clark A. Jeria Frias, San Jose, CA (US); Karimulla Raja Shaikh, Cupertino, CA (US); Shankar Ramamurthy, Saratoga, CA (US)

( * ) Notice: Subject to any disclaimer, the term of this patent is extended or adjusted under 35 U.S.C. 154(b) by 197 days.

(21) Appl. No.: 16/291,436

(22) Filed: Mar. 4, 2019

(65) Prior Publication Data

US 2019/0272016 A1    Sep. 5, 2019

Related U.S. Application Data

(60) Provisional application No. 62/638,453, filed on Mar. 5, 2018, provisional application No. 62/666,773, filed on May 4, 2018.

(51) Int. Cl.
*G06F 1/32* (2019.01)
*G06F 1/329* (2019.01)
(Continued)

(52) U.S. Cl.
CPC .............. *G06F 1/329* (2013.01); *G06F 1/324* (2013.01); *G06F 1/3293* (2013.01)

(58) Field of Classification Search
CPC ......... G06F 1/329; G06F 1/324; G06F 1/3293
See application file for complete search history.

(56) References Cited

U.S. PATENT DOCUMENTS 6,396,170 B1   5/2002   Laufenberg et al.
6,967,283 B2   11/2005  Rasmussen et al.
(Continued)

FOREIGN PATENT DOCUMENTS

EP   2372861 B1     10/2011
JP   2009232521 A   10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — Zahid Choudhury

(57) ABSTRACT

Dynamic tiering of datacenter power for workloads is disclosed. A power capacity, including redundant power capacity and granular power capacity values within a datacenter, is determined. An outage time duration requirement for the power capacity that was determined is evaluated, where the outage time duration requirement is a number of minutes. A hold time duration requirement for the power capacity is evaluated, where the hold time duration is a number of minutes. A number of allowable occurrences of power outage for the power capacity is evaluated. A power requirement metric, based on the outage time duration requirement, the hold time duration requirement, and the number of occurrences, is calculated. A power topology within the datacenter is modified based on the power requirement metric. The modifying provides dynamic power tiering within the datacenter. The dynamic tiering includes a variable service level agreement for power within the datacenter.

24 Claims, 10 Drawing Sheets

(51) Int. Cl.
  *G06F 1/3293* (2019.01)
  *G06F 1/324* (2019.01)

(56) References Cited

U.S. PATENT DOCUMENTS

| | | | |
|---|---|---|---|
| 7,236,896 | B2 | 6/2007 | Farkas et al. |
| 8,067,857 | B2 | 11/2011 | Humphrey et al. |
| 8,193,662 | B1 | 6/2012 | Carlson et al. |
| 8,464,080 | B2 | 6/2013 | Archibald et al. |
| 8,527,619 | B2 | 9/2013 | Ewing et al. |
| 8,595,379 | B1 | 11/2013 | Brandwine |
| 8,958,923 | B2 | 2/2015 | Kake et al. |
| 9,641,025 | B2 | 5/2017 | Agrawal et al. |
| 9,865,998 | B1 | 1/2018 | Emert et al. |
| 9,871,408 | B2 | 1/2018 | Narita |
| 2003/0056125 | A1 | 3/2003 | O'Conner et al. |
| 2005/0071092 | A1 | 3/2005 | Farkas et al. |
| 2005/0162019 | A1 | 7/2005 | Masciarelli et al. |
| 2006/0082222 | A1 | 4/2006 | Pincu et al. |
| 2007/0038414 | A1 | 2/2007 | Rasmussen et al. |
| 2007/0216229 | A1 | 9/2007 | Johnson, Jr. et al. |
| 2008/0067872 | A1 | 3/2008 | Moth |
| 2008/0320322 | A1 | 12/2008 | Green et al. |
| 2009/0144568 | A1 | 6/2009 | Fung |
| 2010/0037070 | A1 | 2/2010 | Brumley et al. |
| 2010/0037225 | A1 | 2/2010 | Doyle et al. |
| 2010/0058092 | A1 | 3/2010 | Bougaev et al. |
| 2010/0077238 | A1 | 3/2010 | Vogman et al. |
| 2010/0102633 | A1 | 4/2010 | Seaton |
| 2010/0205469 | A1 | 8/2010 | McCarthy et al. |
| 2010/0211810 | A1* | 8/2010 | Zacho ............... G06F 1/3203 713/324 |
| 2010/0256959 | A1* | 10/2010 | VanGilder ........ H05K 7/20836 703/6 |
| 2010/0264741 | A1 | 10/2010 | Togare |
| 2010/0328849 | A1 | 12/2010 | Ewing et al. |
| 2011/0133559 | A1 | 6/2011 | Yamashita et al. |
| 2011/0245988 | A1 | 10/2011 | Ingels et al. |
| 2011/0264937 | A1 | 10/2011 | Meisner et al. |
| 2011/0302432 | A1 | 12/2011 | Harris et al. |
| 2011/0304211 | A1 | 12/2011 | Peterson et al. |
| 2012/0054512 | A1 | 3/2012 | Archibald et al. |
| 2012/0066519 | A1 | 3/2012 | El-Essawy et al. |
| 2012/0303993 | A1 | 11/2012 | Nishtala et al. |
| 2014/0031956 | A1 | 1/2014 | Slessman et al. |
| 2015/0057821 | A1 | 2/2015 | Nasle |
| 2015/0180736 | A1* | 6/2015 | Leung ................ H04L 41/5054 709/226 |
| 2015/0378408 | A1 | 12/2015 | Kaplan |
| 2015/0380968 | A1 | 12/2015 | Lee |
| 2016/0020609 | A1 | 1/2016 | Carrasco et al. |
| 2016/0209901 | A1 | 7/2016 | Wilcox et al. |
| 2016/0320825 | A1 | 11/2016 | Panda et al. |
| 2017/0005515 | A1 | 1/2017 | Sanders |
| 2017/0025876 | A1 | 1/2017 | Chan |
| 2017/0177047 | A1 | 6/2017 | Fluman et al. |
| 2017/0201425 | A1 | 7/2017 | Marinelli et al. |
| 2017/0322241 | A1* | 11/2017 | Tang ..................... H02J 13/00 |
| 2019/0122132 | A1 | 4/2019 | Rimini et al. |

FOREIGN PATENT DOCUMENTS

| | | |
|---|---|---|
| WO | WO2011104108 A1 | 9/2011 |
| WO | WO2011119444 A2 | 9/2011 |
| WO | WO2012091323 A2 | 7/2012 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

\* cited by examiner

DYNAMIC TIERING OF DATACENTER POWER FOR WORKLOADS

RELATED APPLICATIONS

This application claims the benefit of U.S. provisional patent applications "Dynamic Tiering of Datacenter Power for Workloads" Ser. No. 62/638,453, filed Mar. 5, 2018, and "Time Varying Power Management within Datacenters" Ser. No. 62/666,773, filed May 4, 2018.

Each of the foregoing applications is hereby incorporated by reference in its entirety.

FIELD OF ART

This application relates generally to power management and more particularly to dynamic tiering of datacenter power for workloads.

BACKGROUND

Organizations such as search providers, on-line retailers, financial institutions, research laboratories, universities, health care providers, and other computing-intensive organizations frequently conduct processing operations from large-scale computing facilities, sometimes referred to as datacenters or, more colloquially, "server farms." The datacenter houses a network of varied, mission-critical systems, all of which are vital to the operation of the organization. The organization uses the datacenter to perform computational operations and to store, process, manage, and disseminate data which is valuable to a variety of business units and departments within the organization. The top priorities for the organization are ensuring uninterrupted operation of the datacenter and protecting the security and reliability of the information resources. Further, datacenters have large and highly fluctuating power requirements. Some of the systems in the datacenter have more stringent power and availability requirements than do other systems. Thus, deployment of equipment within a datacenter, including the physical location of the equipment, can be critical. Datacenters can house many rows of data racks that contain servers, storage devices, routers, backup equipment, communications units, and other IT equipment.

The amount of power demanded of and allocated to the data racks is often very high. This power generation produces heat, which makes cooling of the racks and the datacenter facility a critical concern. Further, the power demand for both industrial applications and datacenters typically fluctuates based on specific business factors, such as the processing job mix and the time of day, month, or season. Thus, managing power, space, and cooling becomes a principal aspect of many industrial applications, including datacenter administration. Furthermore, any energy savings achieved in the datacenter can directly translate into increased profit margins for an organization. Energy savings can also provide additional dividends in terms of reduced wear and tear on power sources and reduced cooling costs, adding to the received benefits of an organization.

The computer systems within the datacenter typically include a large number of components that consume power. Such components include printed circuit boards, mass storage devices, networking interfaces, and processors. Given the precise and ever-increasing power requirements demanded by these components, reliable and efficient power delivery is crucial for successful operation of such server farms. For some data processing applications, the reliability and availability requirements of the datacenter infrastructure must meet or exceed predetermined statutory requirements, such as those requirements mandated for many financial institutions. Further, other statutory requirements demand that specific standards be met to ensure the protection of personal data for customers of financial institutions, healthcare organizations, educational organizations, and retail organizations. The statutory requirements place stringent safeguards on the physical and technical security of personal data, and exact penalties if the safeguards are not met.

Additional infrastructure requirements are dictated because of issues such as availability, reliability, job load, and other organizational demands of datacenters. For example, the issue of effectively cooling a datacenter (i.e. the removal of excess heat) is a critical concern which must be addressed to ensure stable and reliable operation of the center. Each of the many devices in the datacenter generates substantial amounts of heat, whether the device is a server, a blade, a switch, a backup unit, a communications unit, or another device. In fact, the issue of cooling modern datacenters has become so critical a design criterion that it directly impacts the physical layout and design of the center. The equipment in a typical datacenter is arranged is a series of rows. To help control heating and cooling, some datacenters are arranged in "hot rows" and "cold rows," where equipment generating excess heat is grouped together in "hot rows" and is surrounded by rows of cooler-running equipment grouped in "cold rows". The cold rows are so named for their ability to serve as heat sinks, absorbing some of the excess heat generated by the "hot" equipment. Other centers are designed with cooling devices placed adjacent to particularly hot devices, with the cooling devices being equipped with fans, air conditioning units, water cooling systems, and so on. Another significant datacenter design consideration involves providing sufficient power to the datacenter. For some datacenters, power can be provided by more than one power grid to provide redundancy, such as in the case of high-reliability datacenters. For other datacenters, power can be provided by a combination of a power grid and locally generated power. Regardless of how the power is provided, delivering reliable and efficient power to the large number of computers and associated equipment in modern datacenters or server farms is an important aspect of successful operation of such facilities.

SUMMARY

High-reliability and other datacenters dictate stringent power requirements. The power requirements of a datacenter, which can be dynamic in nature, can change greatly over time due to a variety of factors. The factors can include time-based changes of the mix and the quantity of datacenter equipment, changes in positioning of information technology racks or data racks, changes in equipment cooling requirements, and other electrical, thermal, and deployment factors. The factors can also be based on the various combinations of the processing jobs to be executed. The factors can be influenced by the types of loads driven, where the loads can include both AC loads and DC loads. For example, power requirements can increase during normal business hours, and subsequently decrease after-hours and/or on weekends or holidays. Furthermore, the makeup of AC load demand vs. DC load demand can also change as equipment in the datacenter is added or swapped out. For the "soft" factors, the scheduling of various batch jobs and other processing tasks can affect power demands. The power requirement fluctuations can be further based on required software or application activity, planned maintenance, unplanned events such as equipment failure, etc. Datacenters provide vital operations capabilities for businesses, governments, educational institutions, healthcare providers, and many other enterprises. Managing a scalable datacenter power infrastructure is essential to maintaining consistent reliability of the datacenters.

Disclosed techniques provide a method for dynamic tiering of datacenter power for workloads. The dynamic tiering can be based on a variable service level agreement (SLA) for power within the datacenter. A power capacity within a datacenter is determined. The power capacity provides for dedicated slices of power availability during prescribed times. The prescribed times can be times of day, days of month, or months of year. The power capacity provides for on-demand power capacity under specific conditions. The power capacity provides for modifying a virtual machine operation after a specified time period. An outage time duration requirement is evaluated for the power capacity that was determined. The outage time duration requirement is represented as a number of minutes per year. The outage time duration requirement can be included in the SLA. A hold time duration requirement is evaluated for the power capacity. The hold time duration requirement describes a number of minutes where a current power capacity is maintained. The hold time enables power to be maintained while one power source is exchanged or swapped for another. A number of allowable power outage occurrences for the power capacity is evaluated. The number of occurrences is an integer number of outages allowed per year. A power requirement metric is calculated based on the outage time duration requirement, the hold time duration requirement, and the number of occurrences. A power topology is modified within the datacenter based on the power requirement metric. The modifying provides for a dynamic tiering of power within the datacenter. The modifying enables support for varied application usage within the datacenter. The varied application usage can be enabled at a service level agreement per application level. The modifying allows for modifying a virtual machine operation after a specified time period. The modifying includes reliability changes within a variable SLA. The modifying includes moving, rescheduling, or powering off the virtual machine.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
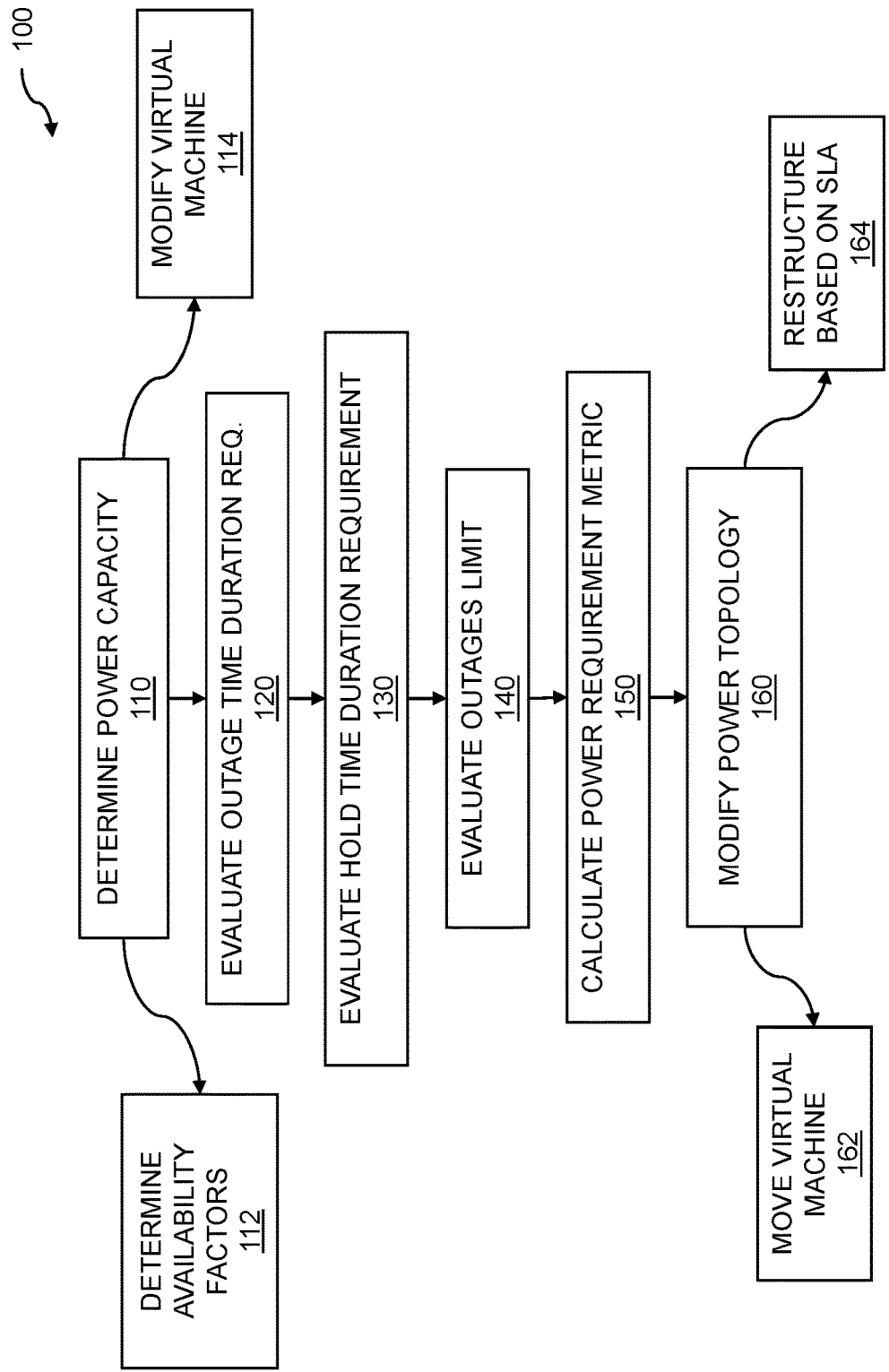
FIG. 1 is a flow diagram for dynamic tiering of datacenter power for workloads.

This disclosure provides techniques for dynamic tiering of datacenter power for workloads. Managing information technology (IT) tasks, including the efficiency and reliability of power distribution, space allocation, and cooling capacity, is highly challenging. The management of these resources is particularly difficult for datacenters, where the supply of and demand for power must be carefully balanced. Some datacenters are dedicated to a single organization, while other datacenters are contracted for use by multiple organizations. Use of a given datacenter by various organizations can be managed based on the amount of equipment a given organization wishes to locate in the datacenter, power load requirements, redundancy requirements for power such as 1N redundancy and 2N redundancy, service level agreements (SLAs) for the power, etc. Datacenter power systems are designed to meet the dynamic power needs of large installations of diverse electrical equipment. A wide range of electrical equipment can be present in a datacenter including devices such as servers, blade servers, communications switches, backup data storage units, communications hardware, and other devices. The electrical equipment can include one or more of processors; data servers; server racks; and heating, ventilating, and air conditioning (HVAC) units. The HVAC units are installed to manage the prodigious heat that is dissipated by all of the electrical equipment in the datacenter. The power systems receive power from multiple power feeds, where the coupled power feeds can derive from grid power such as hydro, wind, solar, nuclear, coal, or other power plants; local power generated from micro-hydro, wind, solar, geothermal, etc.; diesel generator (DG) sets; and so on. The multiple power feeds, which typically number at least two, provide critical redundancy in delivery of power to the datacenter power system. That is, if one power feed were to go down or be taken offline for maintenance, then another power feed can provide the dynamic power needed to drive the power load of large equipment installations such as datacenters.

The use of software defined IT infrastructures, such as compute, network, or storage infrastructures, supports flexible and automated management of datacenter workloads. In disclosed techniques, power control within a datacenter is based on dynamic tiering of datacenter power for workloads. A power capacity within a datacenter is determined. The power capacity can be determined by measurement or calculation, by uploading by a user, downloading from a computer network, and so on. An outage time duration requirement is evaluated for the power capacity that was determined. An outage time duration requirement can be included in a service level agreement between a datacenter provider and a datacenter user. An outage time duration requirement can include a number of outage minutes per year. A hold time duration requirement is evaluated for the power capacity. A hold time duration, or hold up time duration, can include a number of minutes that power can hold after a power event such as an outage and before backup power can be provided. A hold up time can also be considered to be a duration during which a power scenario is maintained after a policy change has been communicated. A number of allowable power outage occurrences for the power capacity is evaluated. The occurrences can include a number of times per year that power can be lost to equipment within the datacenter. A power requirement metric is calculated based on the outage time duration requirement, the hold time duration requirement, and the number of occurrences. The metric can be used to determine equipment requirements necessary to meet various levels of providing power to IT equipment. A power topology within the datacenter is modified based on the power requirement metric. The modifying the power topology can include provisioning power sources, switches, backup power, power buffers, etc., to meet the requirements of the IT equipment. The modifying can provide for a dynamic tiering of power within the datacenter. The dynamic tiering can include a variable service level agreement for power within the datacenter.

FIG. 1 is a flow diagram for dynamic tiering of datacenter power for workloads. The amount and type of power provided to IT equipment within a datacenter can be based on service level agreements, available power, available backup power, job mix, scheduling, and so on. The flow 100 shows a computer-implemented method for power management. The flow 100 includes determining a power capacity 110 within a datacenter. The power capacity can include power sources, backup power sources, local or renewable power sources, and so on. The power sources can include grid power, diesel-generator (DG) set power, renewable power sources such as solar, hydro, wave action, or geothermal sources, and the like. The power capacity can also include heating, ventilating, and air conditioning (HVAC) capacity; a data footprint capacity; etc. The flow 100 further includes determining availability factors 112 for datacenter loads. The availability factors can include availability or reliability of grid power, availability of DG sets, and availability of renewable power sources such as photovoltaic power during daylight hours or wind power when the wind is blowing. An availability factor can include scheduled maintenance or downtimes. The flow 100 includes modifying a virtual machine 114 operation after a specified time period. The modifying a virtual machine can include loading a virtual machine, suspending a virtual machine, or moving a virtual machine from one processor to another processor. The power capacity can be based on other factors and parameters. In embodiments, the power capacity can provide for dedicated slices of power availability during prescribed times. The dedicated slices of power availability can be dedicated to certain IT equipment, virtual machines, jobs, job mixes, etc. In other embodiments, the power capacity can provide for on-demand power capacity under specific conditions. On-demand power capacity can be based on scheduled power requirements, backup power requirements, as-needed power requirements, etc. In embodiments, the power capacity includes a redundant power capacity value. The redundancy capacity value can include 1N redundancy, 2N redundancy, etc. The power capacity can include a set of granular power capacity values. Granular power capacity values can be based on IT rack power usage, power usage by items of IT equipment within an IT rack, and so on.

The flow 100 includes evaluating an outage time duration requirement 120 for the power capacity that was determined. The outage time duration requirement can include a number of outage minutes per year. The outage minutes can be based on power events such as loss of power to the datacenter, scheduled maintenance, and so on. The evaluating can occur on a computing device within the datacenter or a computing device located beyond the datacenter. The flow 100 includes evaluating a hold time duration requirement 130 for the power capacity. A hold time duration, or hold up time duration, requirement can include an amount of time that capacitive storage within IT equipment can maintain power after a power event. The power event can include a power outage, scheduled or unscheduled maintenance, a planned shutdown, etc. The hold time can maintain power to IT equipment while another source is being brought up, reassigned, provisioned, etc. The hold time duration requirement can describe a number of minutes where a current power capacity is maintained. The flow 100 includes evaluating a number of occurrences of power outage 140 allowed for the power capacity. The number of occurrences of power outage can include a power outage time duration requirement. The outage time duration requirement can be represented as a number of minutes per year. The number of occurrences can be an integer number of outages allowed per year.

The flow 100 can include calculating a power requirement metric 150 based on the outage time duration requirement, the hold time duration requirement, and the number of occurrences. The calculation can be based on an objective function, a mathematical function, a heuristic, and so on. The power requirement metric can be determined based on machine learning. The metric can be used as a basis for developing one or more service level agreements (SLA). The flow 100 includes modifying a power topology 160 within the datacenter based on the power requirement metric. The power topology can be based on power sources, transfer switches, power caches, power buffers, uninterruptable power supplies (UPS), and so on. The power topology can include a plurality of power sources. The power topology can be used to provide various types of power to targeted equipment including IT equipment within the datacenter. The topology can include redundancy such as 1N or 2N redundancy. 1N redundancy or 2N redundancy refers to the amount of equipment such as power providing equipment available in a datacenter. 1N redundancy refers to one full set of equipment, while 2N refers to two full sets of equipment. The modifying the power topology can include a rack-level service level agreement (SLA) for power reliability. For critical systems, a high-level SLA can be put in place to ensure that power is available to the critical systems given a wide range of failure and/or emergency scenarios. Other systems which may be used for other, noncritical operations, can be served under a lower-level SLA or no SLA. In other embodiments, the modifying can include tapping into excess power capacity within the datacenter. The additional datacenter power capacity can be determined by recovering power that is unused in data racks in the datacenter. The power can be recovered, for example, by identifying power capacity that is underutilized in data racks and routing the unused power to other data racks.

The modifying the power topology can allow for application usage within the datacenter. The applications can include virtual machines, business applications, research applications, academic applications, and so on. The modifying can provide for a dynamic tiering of power within the datacenter. The dynamic tiering can be based on changing power source availability, changing load requirements, etc. Dynamic tiering can include cost models. The dynamic tiering can include a variable service level agreement for power within the datacenter. The variable service level agreement can include differing levels of service based on cost, time of day, day of month, time of year, season, and so on. In embodiments, the variable service level agreement can enable 1N redundancy to 2N redundancy. In embodiments, the enabling can provide incremental redundancy between 1N redundancy and 2N redundancy. In embodiments, the modifying allows for moving a virtual machine 162 operation after a specified time period. In embodiments, the workload can be a virtual machine. A virtual machine (VM) can be moved or "V-motionable" from a host to another host. The moving of the VM can occur due to elapsed processing time, clock time, etc., based on changing priority levels, service levels, etc. One VM can be moved to accommodate a second VM. In embodiments, the power capacity can provide for modifying a workload operation after a specified time period. The flow 100 further includes restructuring the power topology based on a variable SLA

164. As stated, the variable SLA can include differing levels of power provision based on cost, power source availability, job mix schedules, seasonal factors, etc. In other embodiments, the modifying can include reliability changes within a variable SLA. The reliability changes can include swapping out power sources based on mean time to failure (MTTF); balancing usage time of power supplies, batteries, or buffers; and the like.

Some embodiments further comprise determining a second power capacity within a datacenter, wherein the second power capacity enables calculating an additional power requirement metric. The second power capacity can be calculated on a per customer basis, a per customer group basis, a per application type basis, and so on. In embodiments, the additional power metric can include an additional outage time duration requirement and an additional hold time duration requirement. In embodiments, the determining a second power capacity can include a subset of the power capacity within the datacenter. In embodiments, the determining a second power capacity can include a portion of the power capacity within the datacenter not included in the determining of the power capacity. In embodiments, the determining can include distribution capacity within the datacenter. In other embodiments, the determining can include rack-level granularity. In yet other embodiments, the calculating includes peak shaving. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2A:
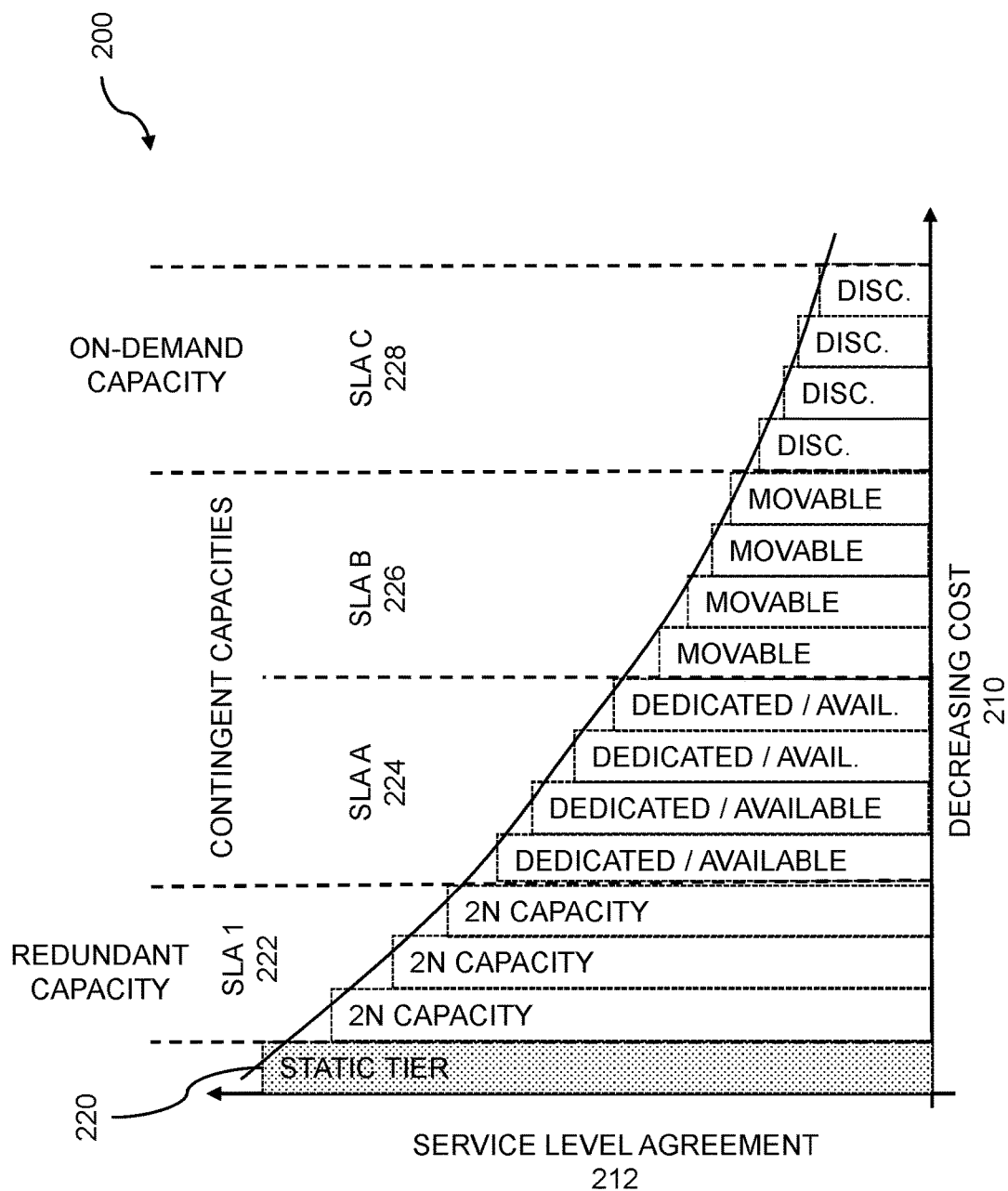
FIG. 2A illustrates service level agreement (SLA) dynamic power tiering.

FIG. 2A illustrates service level agreement (SLA) dynamic power tiering. Dynamic power tiering, as opposed to static power, can be based on software defined power (SDP) techniques. Dynamic tiering of datacenter power is used for powering workloads within the datacenter. Software defined power, which can support programmable, reconfigurable, or modifiable power topologies within a datacenter, can be used to describe an SLA, to measure an SLA, and so on. A plurality of SLAs can be generated based on a capacity of a datacenter. The SLAs can be used to provide physical IT capacity to a variety of users, when the users are in need of the capacity, and at what service level. Two views of dynamic power tiering are shown on FIGS. 2A and 2B, an SLA view 200 and a capacity view 202, respectively.

A service level agreement view of dynamic power tiering is shown 200. The service level can be based on cost 210, were a maximum service level can be expensive, a low service level can be inexpensive, and so on. A maximum service level can include high reliability, minimal power outages or durations, and so on. In the figure, high cost is at the left, with decreasing cost moving toward the right. The level of service 212 can vary, from a low service level or no service level, up to a maximum service level. The service level that is provided directly impacts both the service provider and the service user. The greater the level of user need, the higher the level of service that must be provided by the agreement. If the user need is based on low priority or discretionary processing needs, then the service level can be low, and power can be provisioned accordingly, such as on an as-available basis. The capacity of a datacenter, or the static capacity, can be determined 220. The datacenter capacity, which can be described as the total or static capacity, can be designated SLA 0. The static capacity of the datacenter can be partitioned in two or more capacities or redundant capacities. By partitioning the static SLA 0 capacity, the datacenter capacity can be included or allocated in new SLAs. The new SLAs, SLA 1 222, can be assigned to and agreed upon by various service providers and users, based on user need and service level. SLA 1 can be based on redundant power capacity such as 2N redundancy, 3N redundancy, N+1 redundancy, etc. SLA 1 represents a high service level thereby providing low outage time duration, high hold time duration, few or no power outages, etc.

A next, lower level of service can include contingent capacities. The contingent capacities can include dedicated power capacities that can be made available on demand, where on-demand availability can include times of day, days of week, days of month, and so on. The contingent capacities can include service level agreements supporting various levels of power at a range of price points. The contingent capacities can include SLA A 224. The contingency level, SLA A, can be used to provide slices or portions of the static power at prescribed times. SLA A can be used to provide power when a user has a scheduled increased power need, such as running payroll or other tasks, which can occur on the same date each month. The contingent power agreements of SLA A are useful to both the provider and the user for power needs planning purposes. The provider knows that power must be provided to the user at a specific time, date, and so on, and can make arrangements to provide that power. The user knows that the power needed to perform their scheduled tasks will be available when needed.

Another level of contingent power capacity can be described SLA B 226. Workloads that can be shifted or "v-motioned" from one virtual machine to another virtual machine can use a lower level of service. Service level agreements such as SLA B can include workloads that can be slowed down or suspended until a later point in time. The workloads can be slowed down by various techniques including reducing a processor clock frequency, thereby reducing power consumption by the processor. Slowing the processor clock frequency increases processing time. In other embodiments, the workloads can be shifted from faster processors to slower processors, suspended after a first time period then restarted after a second time period, and so on. If and when the priority of the workload increases, an SLA with a lower level from SLA B can be used. A further power capacity level that covers discretionary tasks can be described. A discretionary capacity level SLA C 228 is shown. Discretionary tasks can be allocated based on a low service level as power capacity becomes available. Discretionary tasks that can be fitted into the workload as capacity warrants can include machine learning tasks, cryptocurrency ledger processing, and so on. Other examples of discretionary tasks can include providing processing time on high end processors that are otherwise inaccessible to researchers.

Figure 2B:
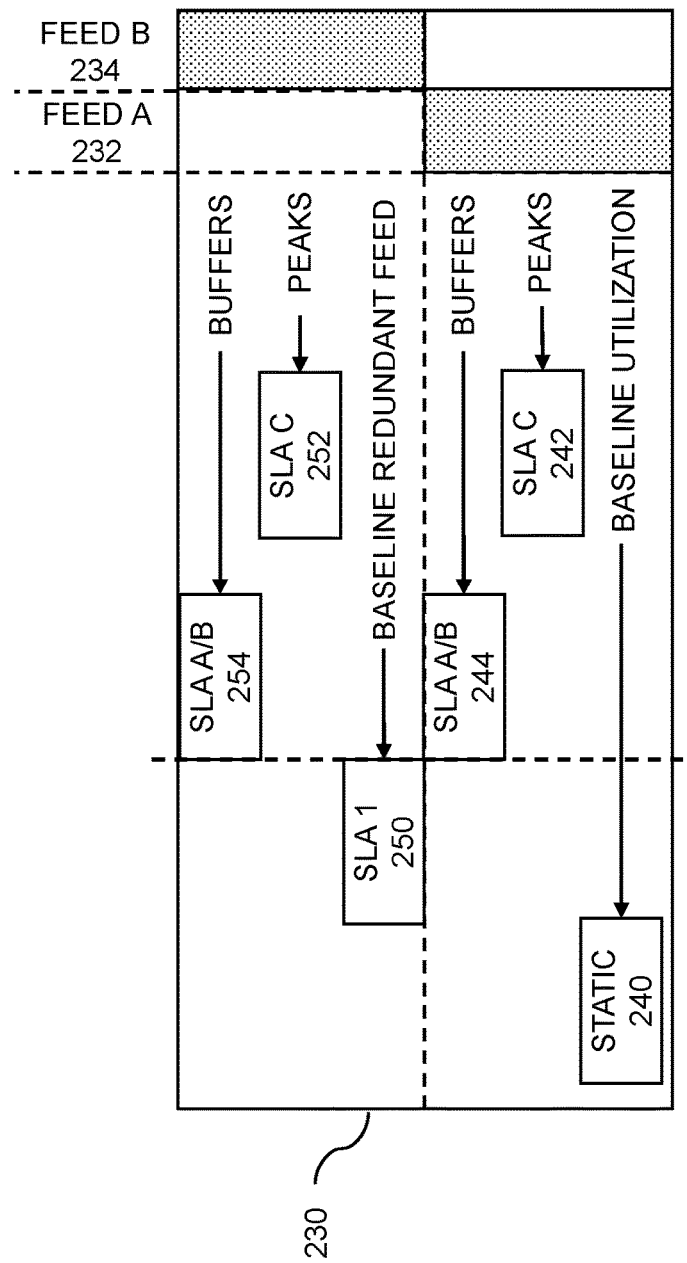
FIG. 2B illustrates capacity view dynamic power tiering.

FIG. 2B illustrates capacity view dynamic power tiering. A capacity view of dynamic power tiering is shown 202. The capacity view can include mapping of available power feeds to power capacities 230. The power feeds can include a primary feed, a backup feed, one or more redundant feeds, and so on. A baseline capacity utilization can map to a static capacity utilization 240, such as the service level agreement SLA 0 described previously. The baseline capacity can be based on a first feed, feed A 232. The feed A can also be used to provide power to cover peak power demands. The peak power demands can be handled based on contingent power capacities. The contingent power capacities can include one or more service level agreements SLA C 242. The service level agreements can correspond to the SLAs SLA A and SLA B described previously. The feed A can further be used to provide buffer power. Buffer power can be provided by discretionary power sources. Buffer power can be used to provide power during short power outages, to cover a transition from one power feed to another power feed, and so on. The numbers of and capacities of the buffers can be based on service level agreements SLA A/B 244, where the service level agreements can correspond to SLAs SLA A and SLA B.

A baseline redundant capacity can also be included in the capacity view. A baseline redundant capacity can include a mapping for the first feed, feed A 232, and a second feed, feed B 234. A baseline redundant feed SLA 1 250 is shown. The baseline redundant feed can correspond to the redundant capacity of the service level agreement SLA 1 described previously. Other power capacities can be used to supplement the baseline redundant capacity, such as power capacities to meet peak power demands. The peak power demands can be met by applying SLAs based on on-demand capacity. The on-demand capacity SLAs can include SLA C 252. Peaks, including peak loads on feed A and peak loads on feed B can further be mapped. When not covering peak loads for higher level service agreements, such as SLA 1, SLA A, and SLA B, the peak power capacity can be used to power discretionary loads, SLA C. Further power capacities can be used to supplement the baseline redundant capacity. The additional power capacities can include power capacities that provide power buffering. Power buffers, which include buffers from feed A and buffers from feed B can also be mapped. The power buffers can provide power such as contingency power for scheduled power demand events including running payroll, etc. Contingency power demands can be covered by service level agreements SLA A/B 254. The service level agreements can correspond to the SLAs SLA A and SLA B described previously. The power buffers can provide dedicated power at prescribed times, SLA A.

Figure 3:
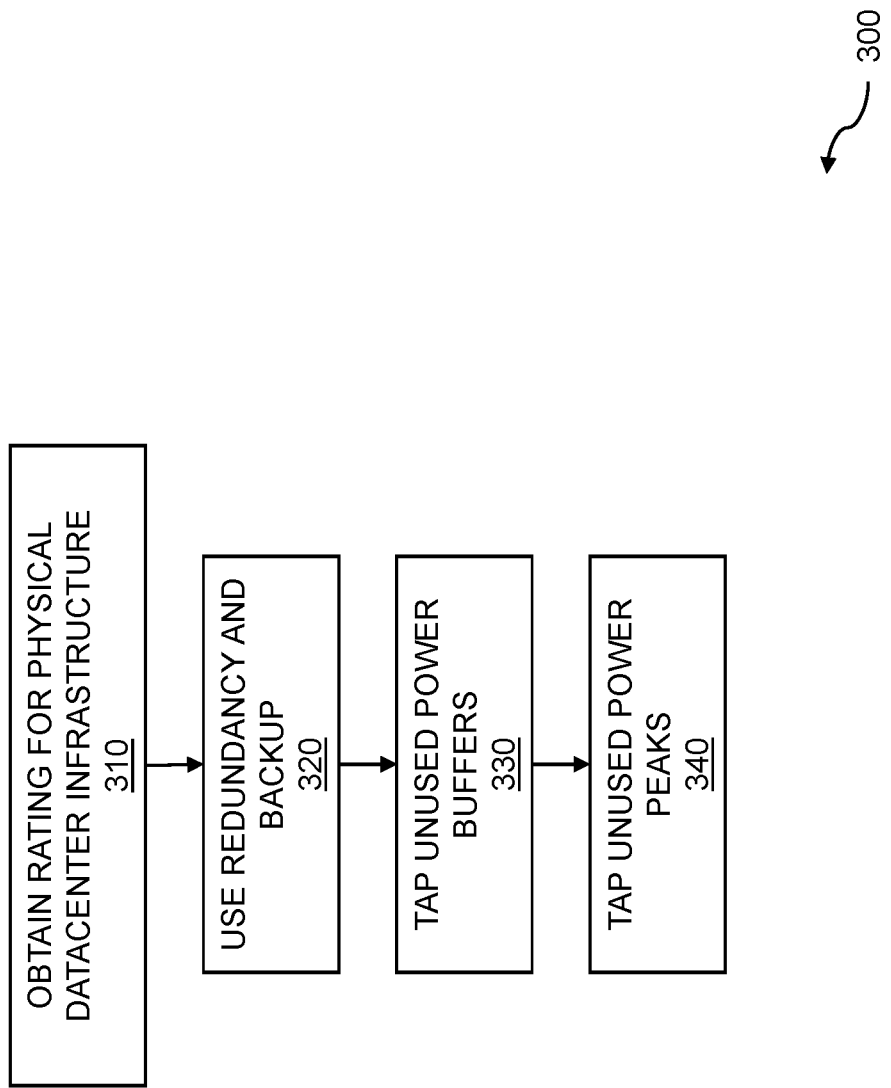
FIG. 3 is a flow diagram for SLA handling.

FIG. 3 is a flow diagram for SLA handling. Service level agreements (SLAs) can be configured to support power requirements of a variety of datacenter customers. The service level agreements can include the dynamic IT power requirements of the users. The SLAs can be based on power-related parameters such as an outage time duration requirement, a hold time duration requirement, a number of power outages, and so on. The SLAs can include variable SLAs, where the agreements can be changed or substituted based on job mix, workload, scheduled heavy usage times, power events, and the like. The SLAs can support tiering, where the tiering is based on varying levels of power and availability of that power. The tiering, including dynamic tiering, maintains levels of support ranging from discretionary or non-critical operations to highly critical operations. SLA handling can support dynamic tiering of datacenter power for workloads.

Providers, customers, managers, and other interested parties can examine and analyze present power provisioning capabilities of a datacenter to determine how to provide more service, obtain more service, or derive more benefit from the datacenter capabilities. The datacenter capabilities can be based on current capacity, desired capacity, and so on. Service level agreements can be based on allocating and ensuring certain power capacity levels to the various customers. The flow 300 includes obtaining a rating for a physical datacenter infrastructure 310. The rating can include an amount of power available, where the power available can be sourced from a power grid, from a diesel-generator set (DG), from local sources including renewable sources, and so on. The datacenter infrastructure rating can include AC power, DC power, backup power, hold time power, etc. The flow 300 includes using redundant power and backup power 320. The redundant power can include multiple grid feeds into a datacenter, multiple power feeds into a rack for dual-corded electrical equipment, and the like. The backup power can include the DG sets, uninterruptable power supplies (UPS), batteries associated with alternative power sources such as photovoltaic sources, etc. The backup power sources can be used to provide power such as peak power to loads. The flow 300 includes tapping unused power buffers 330 within the datacenter. Power buffers can be used to provide power during load spikes, to capture excess power, and so on. The power buffers can be configured to provide power, such as providing dynamic power, to electrical loads as part of an SLA. If the unused buffers are used to cover an SLA, then the unused buffers may not be available to provide power during power usage demand spikes or transient power events. The flow 300 includes tapping unused power peaks 340. The power peaks can occur due a given job mix, server loads, and so on. The batteries can provide power to cover a given dynamic SLA. If the batteries are used to cover an SLA, then the batteries may not be available to cover peak power load or to meet longer hold up times in support of higher SLA workloads.

Figure 4:
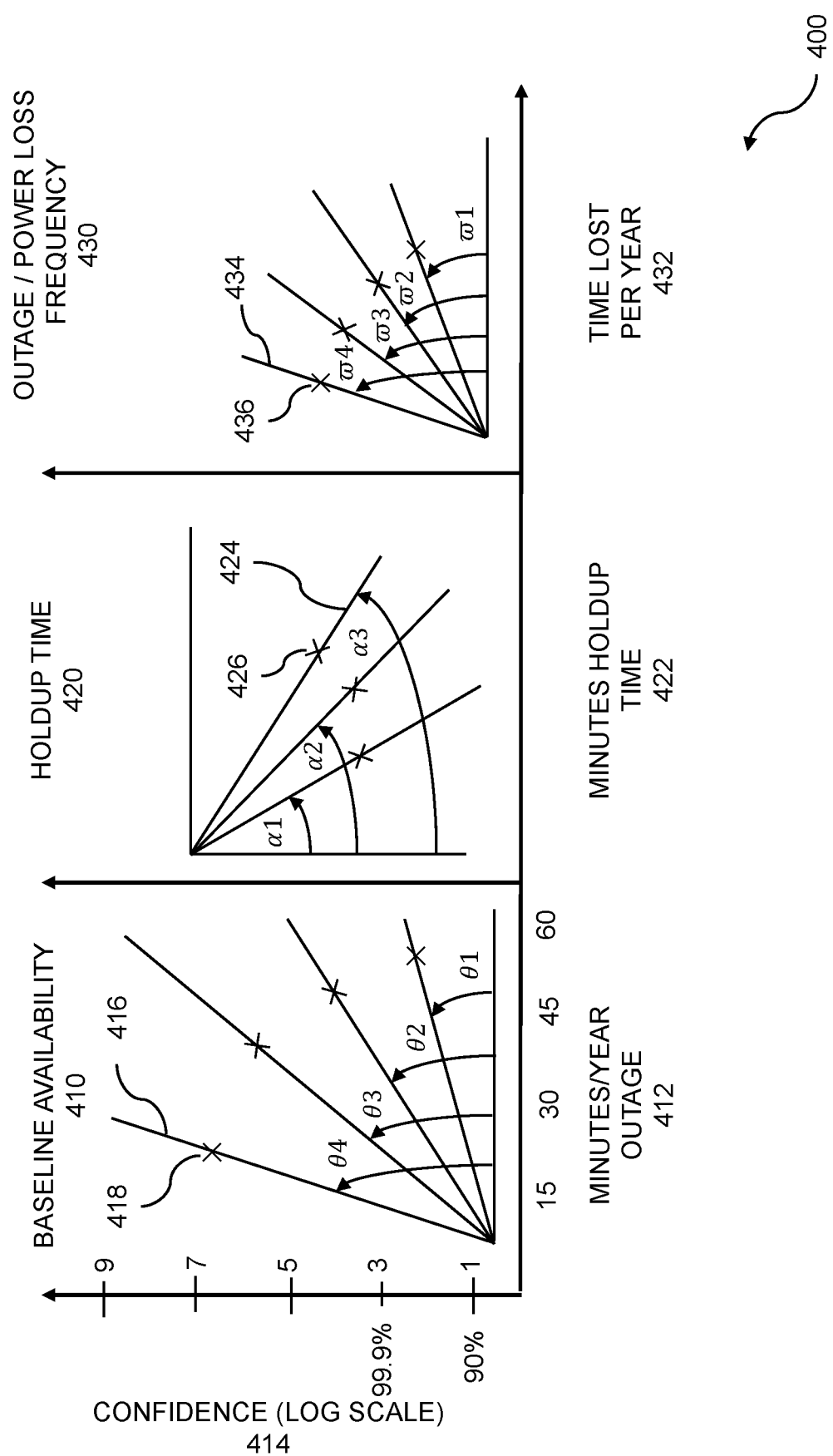
FIG. 4 shows tiering based on measurements.

FIG. 4 shows tiering based on measurements 400. Various measurements can be performed to support dynamic tiering of datacenter power for workloads. The measurements that are performed can be related to elements of power availability. Power availability can include sufficient power to meet workload needs, redundant power, backup power, peak power, and so on. The measurements can be analyzed statistically. The analysis of power availability enables the power provider to determine what levels of service can be provided within a datacenter to a user. The user can analyze the available service levels to choose a service level agreement that can support their power needs.

A baseline power availability theta 410 is shown. The baseline power availability can range from never available to always available. The baseline availability can plot a confidence of power availability on a log scale 414 versus a number of power outage minutes per year 412. The confidence level can be given by the number of nines. Two "nines" can indicate 99% confidence, three "nines" can represent 99.9% confidence, and so on. Various plots, such as plot 416, can be made which plot a confidence level versus a number of outage minutes. The plots can be considered levels of service. The crosses, such as cross 418, show a point on a plot beyond which the threshold of maximum number of outage minutes per year would be exceeded. A higher confidence that a low number of outage minutes can be attained per year indicates a higher service level.

A hold up time alpha is shown 420 for which hold up time can range from zero minutes to some maximum number of minutes 422. The confidence level, plotted on a log scale 414, of sustaining a hold up time for a number of minutes 422 decreases as the number of hold up time minutes increases. Plots such as 424 can be made that show a confidence level of sustaining the holdup time for N minutes. Crosses such as cross 426, can show a point beyond which the confidence of being able to sustain a hold up time has fallen below a threshold. A higher confidence that a high number of hold up time minutes can be provided correlates to a higher service level.

A frequency omega, or a number of times that a power outage occurs, is shown 430. The number of outages can include a number of outages over a time period such as a day, week, month, year, etc. The log of the confidence level 414 can be plotted versus a number of times that power can be lost 432. A confidence level of enduring fewer power outages can be plotted. Various plots are shown. A cross, such as cross 436 on line 434, can indicate that a threshold for a maximum number of power outages over a time period such as a year would be exceeded for a given service level. Individually or in combination, the measurements theta, alpha, and omega can be used to determine whether a level of service for power provision can be provided by the power provider to the power user. The values for theta, alpha, and omega can be an accepted measurement for enabling equipment, systems, and datacenter operations using a common denominator. Further, there can be a quantitative basis to conduct tradeoffs between theta and alpha subject to certain omega terms.

Figure 5:
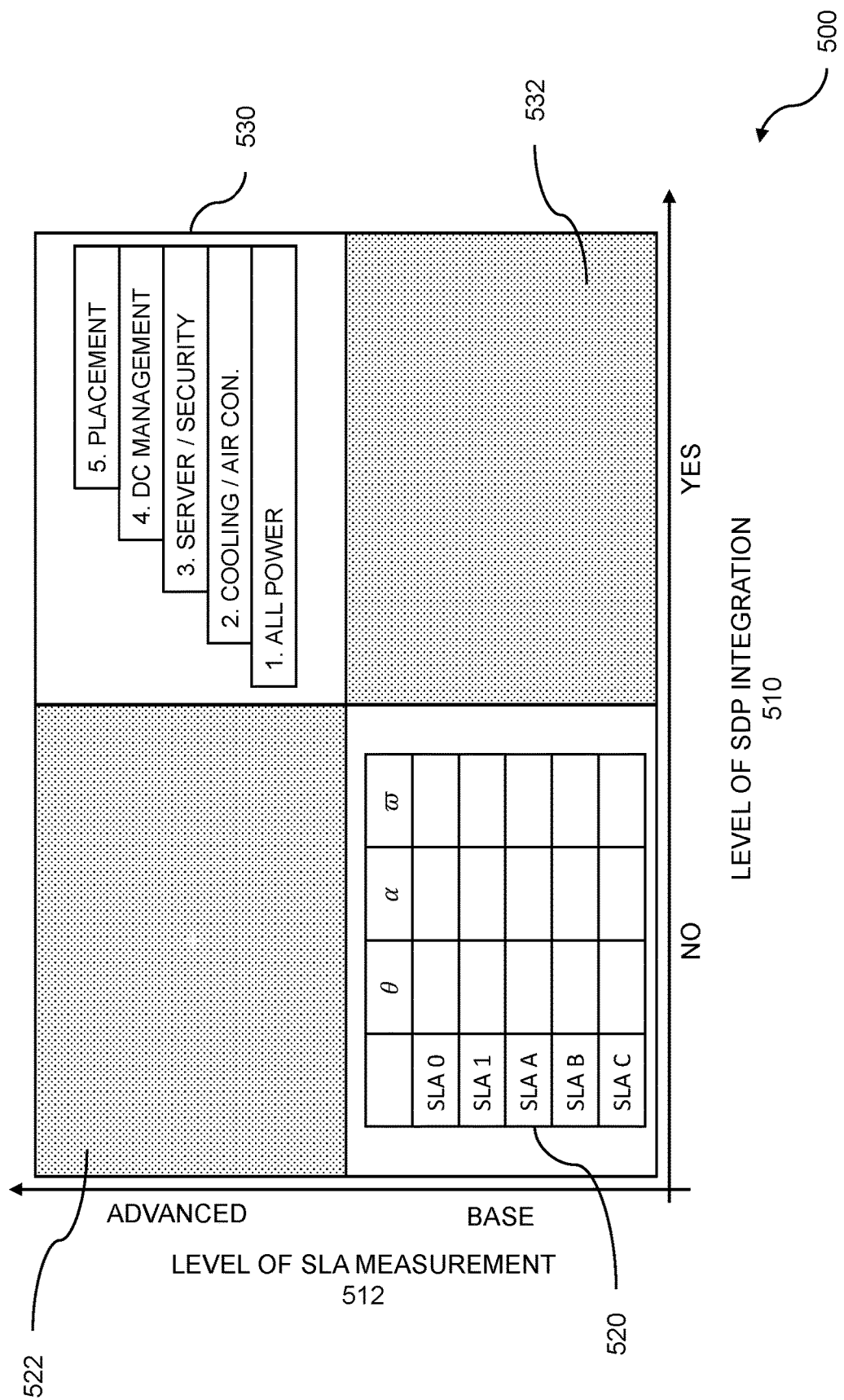
FIG. 5 shows software power tiering.

FIG. 5 shows software power tiering. Software power tiering 500 can be based on one or more service level agreements (SLA) for providing power calculated from measurement and specification. Software power tiering can be further based on software defined power (SDP) techniques. Software power tiering can support dynamic tiering of datacenter power for workloads. SDP can use software to manage and optimize power distribution throughout a datacenter. SDP can include modifications to a power topology within the datacenter. The modifications made to the datacenter power topology by the SDP techniques can be informed by machine learning techniques. A table 500 that includes levels of SDP integration 510 designated by no and yes is shown. The table further includes levels of SLA measurement 512 designated by base and advanced. In the lower left-hand corner of the table 520, various service level agreements can be shown. The service level agreements can include tier levels discussed elsewhere such as a static level SLA 0, a redundant capacity level SLA 1, contingent capacities SLA 2 and SLA 3, a discretionary capacity level SLA 4, etc. The tier levels can also include measurements such as an outage time duration requirement theta, a hold time duration alpha, a frequency of power outages omega, and so on. The SLAs and be offered by the power provider/datacenter operator based on the measurements theta, alpha, and omega. The user can select one or more SLAs that meet their power needs. The upper left-hand corner of the table, 522, is a "don't care" state. Since there is no SDP integration with the SLAs, there is no need for advanced measurement techniques.

The upper right-hand corner of the table 530 shows some additional measurements including capacity measurements that can be performed when SDP integration supplements SLAs. The additional measurements that can be made can include all power devices. These low level or level 1 measurements can include renewable power sources, diesel-generator (DG) sets, breaker sets within the datacenter, and so on. The additional measurements can include heating, cooling, and air conditioning (HVAC) measurements. These level 2 measurements can be made to determine environmental operating conditions within the datacenter and remaining HVAC capacity. The measurements can include server status and security status. These level 3 measurements can include physical statuses such as placing servers in cages, locking access doors, controlling access, and so on. The measurements can include datacenter management. These level 4 measurements can include determining a power topology within the datacenter, where the power topology includes power sources, backup power sources, power buffers, etc. The measurements can include workload placement. These level 5 measurements can include determining the location and status of various processes, virtual machines (VM), etc. The level 5 measurements can include determining a priority or a workload, the time that a workload has been running, and the like. The lower right-hand corner 532 is a "don't care" state. SDP integration with the SLAs incorporates additional measurements beyond base measurements.

Figure 6:
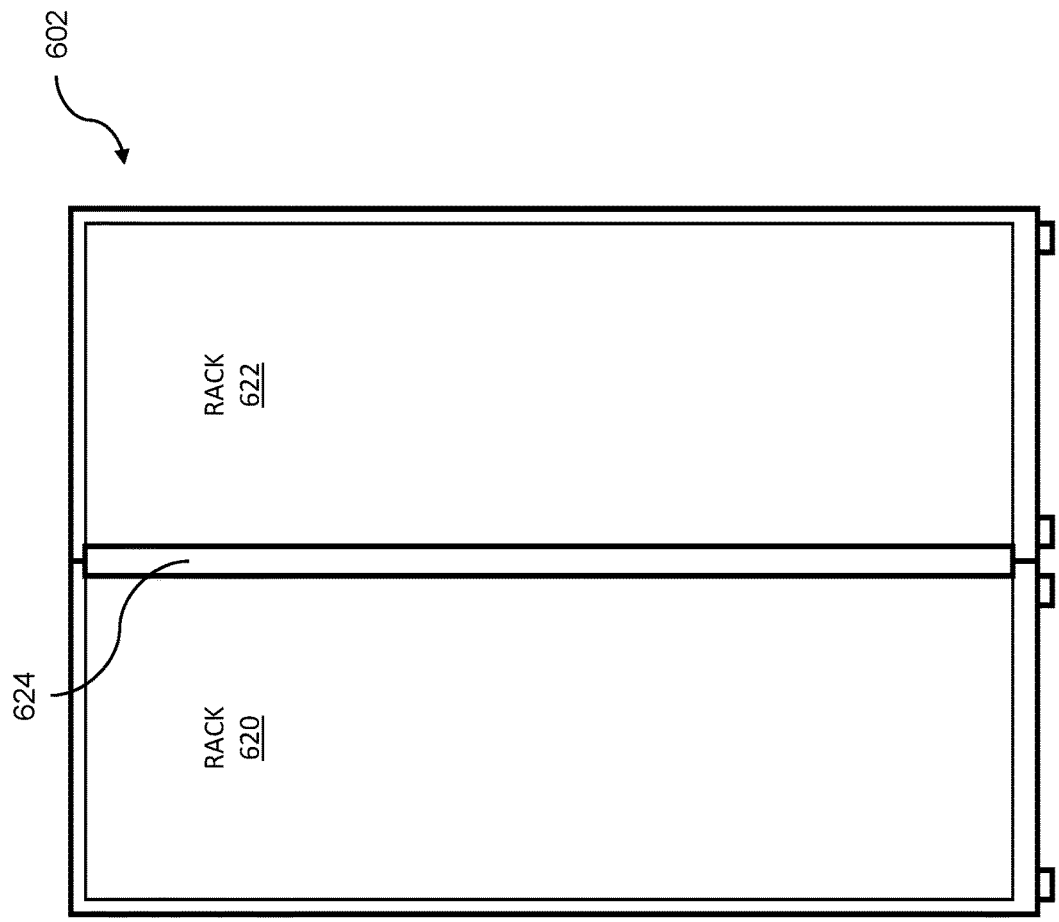
FIG. 6 shows example rack and power configurations.
Figure 6:
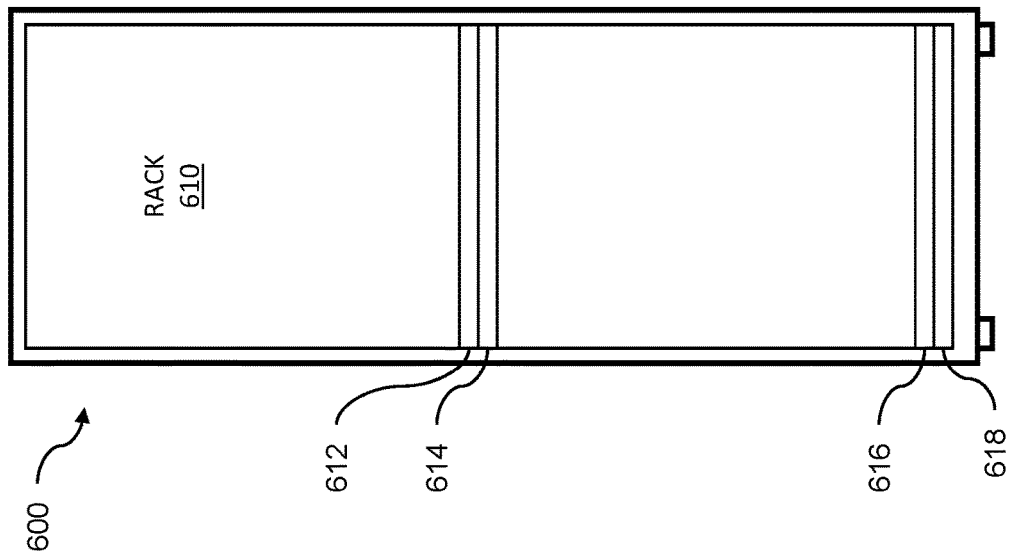

FIG. 6 shows example rack and power configurations. Data racks or information technology (IT) racks can contain computing equipment, communication equipment, and other electrical equipment. The electrical equipment can include power supplies, batteries, uninterruptable power supplies, and so on. The electrical equipment within the data racks can be powered based of dynamic tiering of datacenter power for workloads. A power capacity for a datacenter is determined and key parameters are evaluated. A power requirement metric based on the parameters is calculated, and a power topology within the datacenter is modified. The modifying provides for dynamic tiering of power within the datacenter, where the dynamic tiering includes a variable service level power agreement. The figure shows two example rack and power configurations, a first configuration 600, and a second configuration 602. One or more batteries, one or more power supplies, a plurality of connectors, a plurality of power sensors, a plurality of load sensors, and controllers can comprise a consolidated rack mount power system. An example system is shown in the first configuration 600 which includes rack 610, in turn composed of consolidated rack mount power systems 612, 614, 616, and 618. The one or more batteries, the plurality of power supplies, the plurality of connectors, the plurality of power sensors, the plurality of load sensors, the plurality of converters, and the controllers can comprise a consolidated side mount power system. An example setup is shown in the second configuration 602 which includes a first rack 620 and a second rack 622, together composing a consolidated side mount power system 624 placed between the first rack 620 and the second rack 622. The consolidated rack mount power system and the consolidated side mount power system can be stackable. For example, consolidated rack mount power systems 612 and 614 are stacked one on top of another in adjacent rack spaces. The rack mount power systems can be evaluated and connected to the various electrical components contained with the racks 610, 620, and 622. The evaluating and connecting the AC and DC power sources, and the controlling the power sources, can be accomplished using a software-defined power infrastructure. In embodiments, the software-defined power infrastructure can control the evaluating and the connecting in a dynamic manner.

The stacking can provide for N+ parallelization. N+ parallelization refers to a number of additional power supplies beyond the required number which are kept as standby or reserve power supplies. For example, if a particular cluster of racks requires six power supplies, an N+1 configuration would provide seven power supplies, an N+2 configuration would provide eight power supplies, and so on. The stacking can also provide for 2N parallelization. Again, using the example of six required power supplies, a 2N parallelization scheme would provide 12 power supplies. In the 2N redundancy configuration, any critical path in the power system is replicated to remove single points of failure and increase robustness. The consolidated side mount power system can also provide power across multiple racks. For example, a single consolidated side mount power system 624 can provide power across a first rack 620 and a second rack 622.

Figure 7:
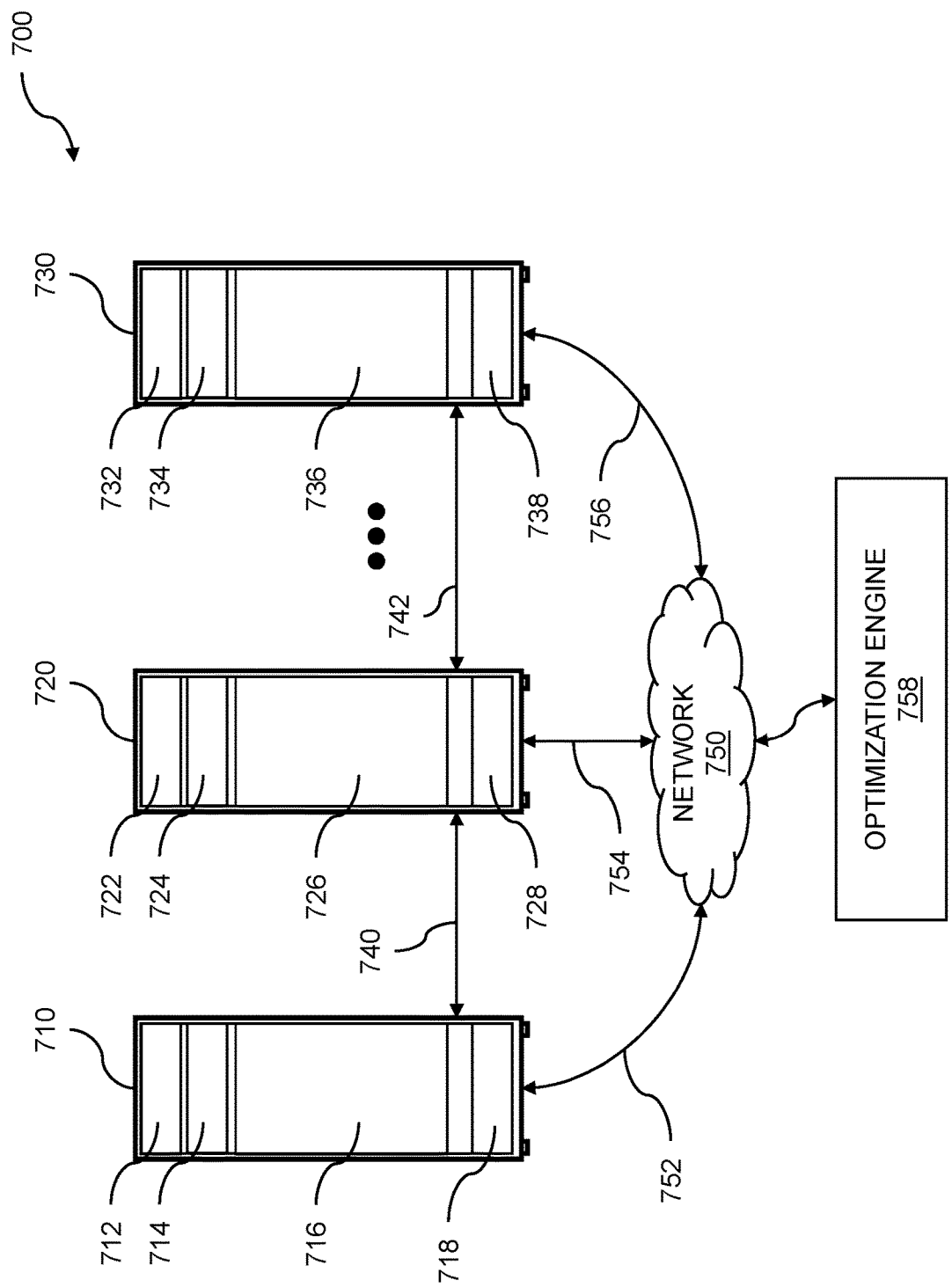
FIG. 7 shows a datacenter rack configuration.

FIG. 7 shows a datacenter rack configuration. Data racks, also called information technology (IT) racks, contain a variety of electrical equipment for which power is controlled. A datacenter can include multiple data racks which can be powered based on dynamic tiering of datacenter power for workloads. A power capacity within a datacenter is determined, and parameters including an outage time duration requirement, a hold time duration requirement, and a number of power outages are evaluated. A power requirement metric based on the evaluated parameters is calculated. A power topology within the datacenter is modified based on the metric. The modifying provides for a dynamic tiering within the datacenter, where the dynamic tiering includes a variable service level agreement (SLA) for power.

A datacenter can include multiple data racks. Example 700 includes three data racks, indicated as rack 710, rack 720, and rack 730. While three data racks are shown in example 700, in practice, there can be more or fewer data racks. The data rack 710 includes a power cache 712, a first server 714, a second server 716, and a power supply 718. The power supply 718 can be used for AC-DC conversion and/or filtering of power to be used by the servers 714 and 716, as well as replenishment of the power cache 712. In embodiments, the power cache 712 includes an array of rechargeable batteries. In embodiments, the batteries include, but are not limited to, lead-acid, nickel metal hydride, lithium ion, nickel cadmium, and/or lithium ion polymer batteries. Similarly, the data rack 720 includes a power cache 722, a first server 724, a second server 726, and a power supply 728. Furthermore, the data rack 730 includes a power cache 732, a first server 734, a second server 736, and a power supply 738. The data racks are interconnected by communication links 740 and 742. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 700, a power cache can be located on each of the multiple data racks within the datacenter. In embodiments, the power cache includes multiple batteries spread across the multiple data racks.

Each rack may be connected to a communication network 750. Rack 710 is connected to network 750 via communication link 752. Rack 720 is connected to network 750 via communication link 754. Rack 730 is connected to network 750 via communication link 756. The optimization engine 758 can retrieve operating parameters from each rack. In embodiments, the operating parameters are retrieved via SNMP (Simple Network Management Protocol), TR069, or other suitable protocol for reading information. Within a Management Information Base (MIB), various Object Identifiers (OIDs) may be defined for parameters such as instantaneous power consumption, average power consumption, number of cores in use, number of applications currently executing on a server, the mode of each application (suspended, running, etc.), internal temperature of each server and/or hard disk, and fan speed. Other parameters may also be represented within the MIB. Using the information from the MIB, the optimization engine 758 may derive a new dispatch strategy in order to achieve a power management goal. Thus, embodiments include performing the optimizing with an optimization engine.

Figure 8:
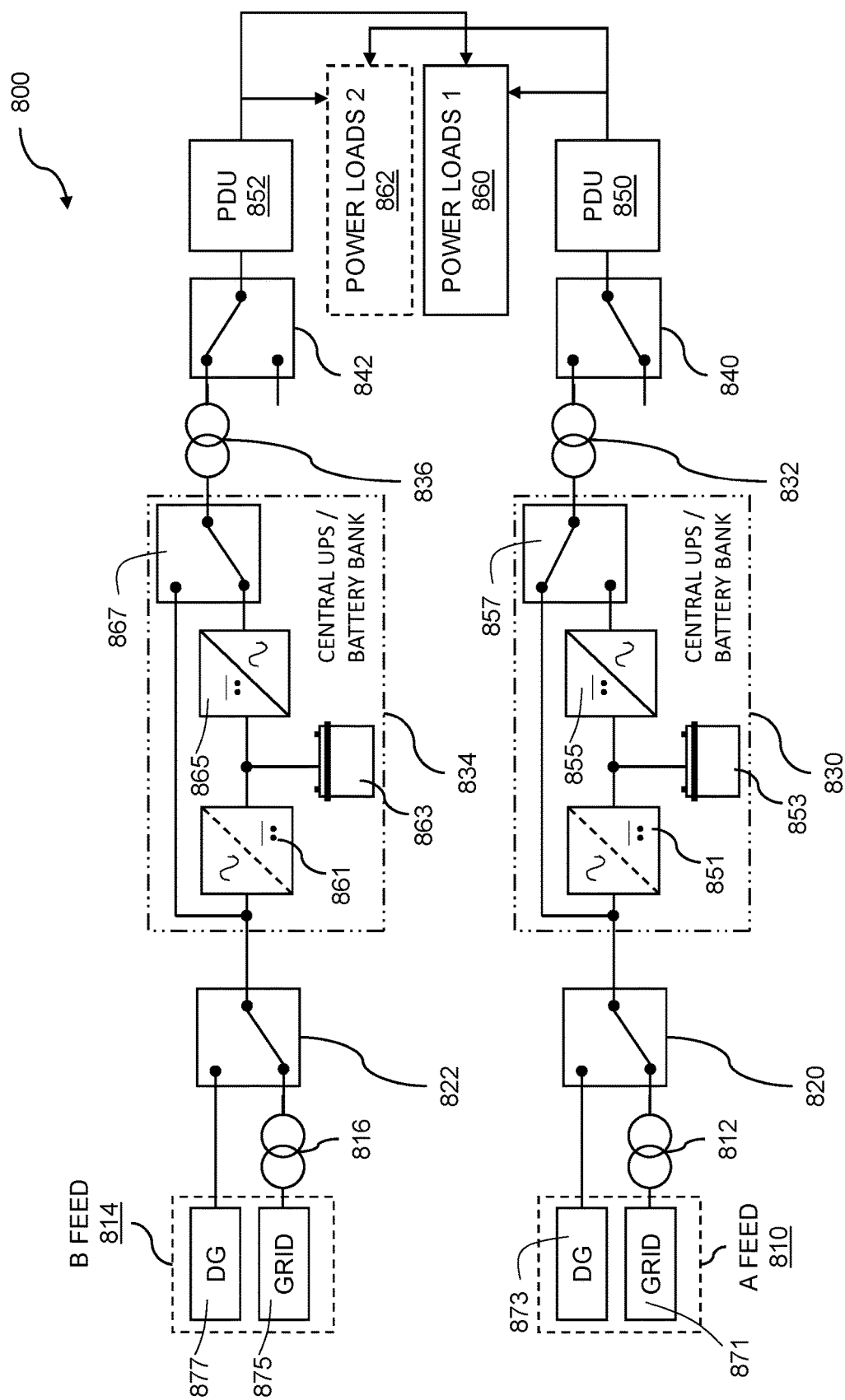
FIG. 8 shows a topology representation.

FIG. 8 shows a topology representation. Power, space, cooling, and other critical resources of a datacenter can be based on dynamic tiering of datacenter power for workloads. A power capacity within a datacenter can be determined, and various parameters including an outage time duration requirement, a hold time duration requirement, and a number of power outages, can be evaluated. A power requirement metric can be calculated based on the evaluated parameters. A power topology can be modified within the datacenter based on the power requirement metric. The modifying can provide for a dynamic tiering of power within the datacenter, where the dynamic tiering can include a variable service level agreement for power within the datacenter.

The topology representation 800 includes a first main power source 810, referred to as the "A feed." The topology representation 800 further includes a second main power source 814, referred to as the "B feed." Each feed is capable of powering each device in the datacenter simultaneously. This configuration is referred to as 2N redundancy for power. The A feed 810 includes a grid source 871, and a secondary, local source of a diesel generator (DG) 873. The grid source 871 is input to a power regulator 812 and then into one input of a switch block 820. The diesel generator 873 is connected to a second input of the switch block 820. The switch block 820 can be configured, by arrangement of a power policy, to select the diesel generator source or the grid source. The switch block 820 feeds into an uninterruptable power supply (UPS) 830. The UPS 830 includes an AC-DC converter 851 configured to charge a power cache 853. In embodiments, the power cache 853 is a battery. The UPS 830 further includes a DC-AC converter 855 that feeds into an input of a switch block 857. The output of the switch block 820 feeds into a second input of the switch block 857. The output of the UPS 830 is input to a power regulator 832, and then to an input of a switch block 840. The switch block 857 can be configured, based on a power policy, to provide power from the power cache, or to bypass the power cache and provide power directly from the local or grid power source. The second input of the switch block 840 is not connected, such that if the second input is selected, the A feed 810 is disconnected from the PDU 850. The PDU (Power Distribution Unit) distributes power within a datacenter and feeds the power loads 860 within the datacenter. In embodiments, a second set of power loads 862 may be added as part of a simulation of a dynamic power scenario. A controller (not shown) can control the PDU 850. The controller can be an intelligent power controller. The controller can receive a power policy for use in the datacenter. The controller can use a key. The key can be used to support secure communications to and from the controller. The key from controller can be uploaded by a user, downloaded from the internet, embedded in the controller, and so on.

Similarly, the B feed 814 includes a grid source 875, and a secondary, local source of a diesel generator (DG) 877. The grid source 875 is input to a power regulator 816 and then into one input of a switch block 822. The diesel generator 877 is input to a second input of the switch block 822. The switch block 822 can be configured, based on a power policy, to select the diesel generator source or the grid source. The switch block 822 feeds into a UPS 834. The UPS 834 includes an AC-DC converter 861 configured to a charge power cache 863. In embodiments, power cache 863 may be a battery. The UPS 834 further includes a DC-AC converter 865 that feeds into an input of a switch block 867. The output of the switch block 822 feeds into a second input of a switch block 867. The switch block 867 can be configured, based on a power policy, to provide power from the power cache, or to bypass the power cache and provide power directly from the local or grid power source. The output of the UPS 834 is input to a power regulator 836, and then to an input of a switch block 842. The second input of the switch block 842 is not connected, such that if the second input is selected, the B feed 814 is disconnected from the PDU 852, which in turn feeds the first set of power loads 860 and/or the second set of power loads 862 within the datacenter. A controller (not shown) can control the PDU 852. The controller can receive a power policy for use in the datacenter. The controller can use a key. The key can be used to support secure communications to and from the controller. The key can be uploaded by a user, downloaded from the internet, embedded in the controller, and so on.

Thus, the A feed 810 and the B feed 814 comprise a first main power source and a second main power source. The first power source and the second power source can provide 2N redundancy to the power load. Furthermore, in embodiments, the power source and a second power source share power to the multiple data racks, wherein the power is shared on a fractional basis. A variety of dynamic power scenarios can be simulated based on the topology shown in FIG. 8.

Figure 9:
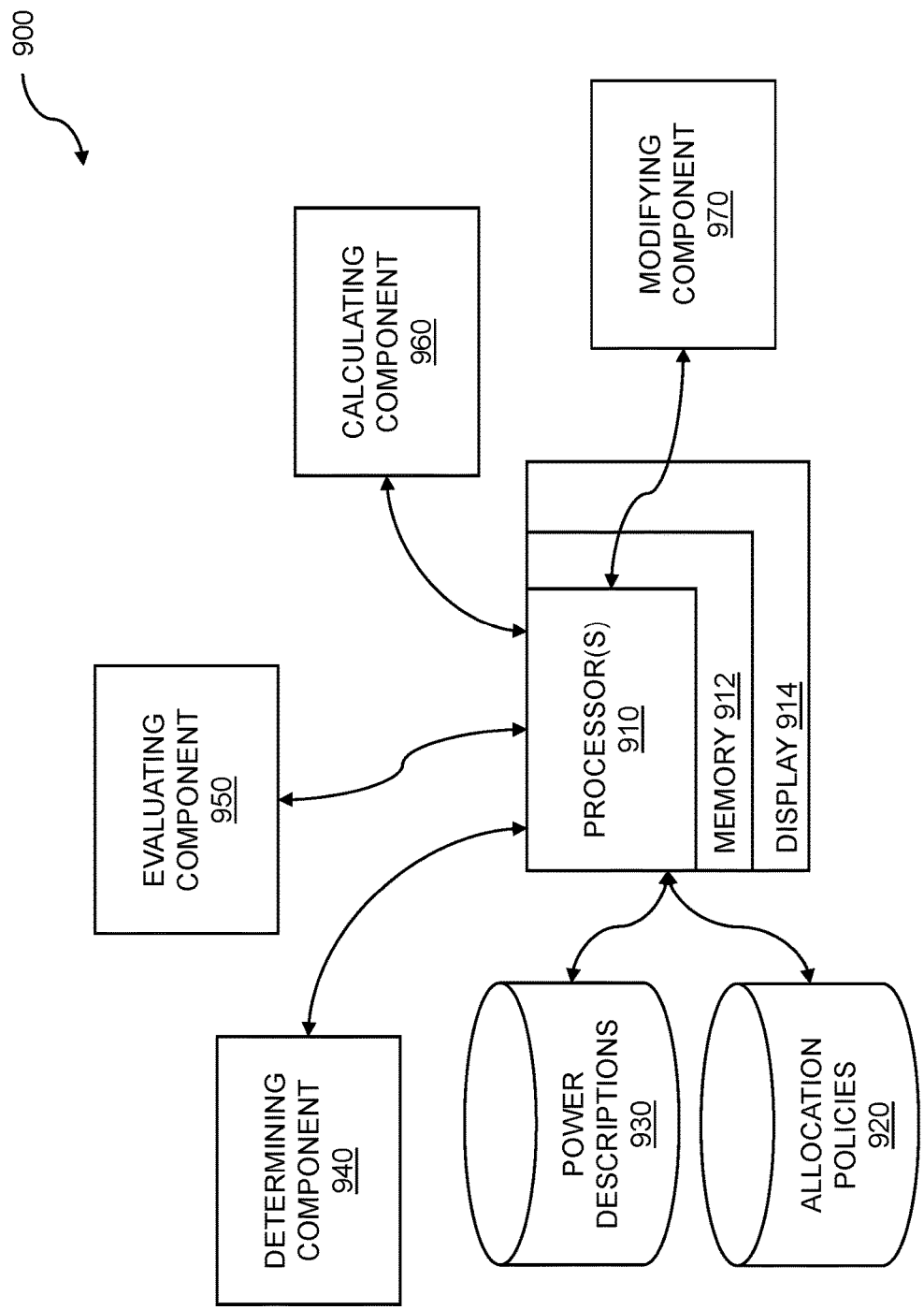
FIG. 9 shows a system diagram for dynamic tiering of datacenter power for workloads.

FIG. 9 shows a system diagram for dynamic tiering of datacenter power for workloads. A power capacity within a datacenter is determined. An outage time duration requirement is evaluated for the power capacity that was determined. A hold time duration requirement for the power capacity is evaluated. A number of allowable occurrences of power outage for the power capacity is evaluated. A power requirement metric, based on the outage time duration requirement, the hold time duration requirement, and the number of occurrences, is calculated. A power topology within the datacenter is modified based on the power requirement metric. The modifying provides for a dynamic tiering of power within the datacenter. The dynamic tiering includes a variable service level agreement for power within the datacenter.

The system 900 can include one or more processors 910 and a memory 912 which stores instructions. The memory 912 is coupled to the one or more processors 910, wherein the one or more processors 910 can execute instructions stored in the memory 912. The memory 912 can be used for storing instructions; for storing databases of power sources, power caches, and power loads; for storing information pertaining to load requirements or redundancy requirements; for storing power policies; for storing service level agreements; for system support; and the like. Information regarding datacenter service level agreements including dynamic service level agreements can be shown on a display 914 connected to the one or more processors 910. The display can comprise a television monitor, a projector, a computer monitor (including a laptop screen, a tablet screen, a netbook screen, and the like), a smartphone display, a mobile device, or another electronic display.

The system 900 includes allocation policies 920. The allocation polices can include service level agreements, dynamic service level agreements, and so on. In embodiments, the allocation policies 920 are stored in a networked database, such as a structured query language (SQL) database. The allocation policies 920 can include limits, such as power consumption limits, as well as switch configurations when certain conditions are met. For example, when conditions allow peak shaving to take place, and surplus power exists, the power policies can identify switches and their configurations to allow replenishing of the power caches. The system 900 further includes a repository of power descriptions 930. The power descriptions 930 can include, but are not limited to, power descriptions of power loads, power caches, power supplies, rack power profiles, batteries, buses, circuit breakers, fuses, and the like. The power descriptions can include physical space needs, electrical equipment cooling requirements, etc. The system 900 can include a determining component 940. The determining component 940 can be used for determining a power capacity within a datacenter. The power capacity can be based on available power sources such as grid power, diesel-generator power, or alternative energy sources; battery backup capabilities; and so on.

The system 900 includes an evaluating component 950. The evaluating component 950 is configured to evaluate an outage time duration requirement for the power capacity that was determined, to evaluate a hold time duration requirement for the power capacity, and to evaluate a number of occurrences of power outage allowed for the power capacity. The evaluating can be performed on computing equipment such as a local server, a remote server, a cloud-based server, a mesh server, and the like. The system 900 includes a calculating component 960. The calculating component 960 can calculate a power requirement metric based on the outage time duration requirement, the hold time duration requirement, and the number of occurrences. The power requirement metric can be used to specify one or more dynamic service level agreements (SLAs) that can meet or exceed the power requirement metric. The system 900 includes a modifying component 970. The modifying component 970 can modify a power topology within the datacenter based on the power requirement metric. In embodiments, the modifying can allow for moving a virtual machine operation after a specified time period. The specified period of time can be based on a minimum or guaranteed run time. Further embodiments include restructuring the power topology based on a variable SLA. The restructuring of the power topology can include moving unused power from one data rack to another data rack within the datacenter, allocating excess power, capturing excess power, providing supplemental power when needed, etc.

Disclosed embodiments can include a computer program product embodied in a non-transitory computer readable medium for power management, the computer program product comprising code which causes one or more processors to perform operations of: determining a power capacity within a datacenter; evaluating an outage time duration requirement for the power capacity that was determined; evaluating a hold time duration requirement for the power capacity; evaluating a number of occurrences of power outage allowed for the power capacity; calculating a power requirement metric based on the outage time duration requirement, the hold time duration requirement, and the number of occurrences; and modifying a power topology within the datacenter based on the power requirement metric.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for power management comprising:
   determining a power capacity within a datacenter;
   evaluating an outage time duration requirement for the power capacity that was determined;
   evaluating a hold time duration requirement for the power capacity;
   evaluating a number of occurrences of power outage allowed for the power capacity;
   calculating a power requirement metric based on the outage time duration requirement, the hold time duration requirement, and the number of occurrences; and
   modifying a power topology within the datacenter based on the power requirement metric, wherein the modifying provides for a dynamic tiering of power within the datacenter, wherein the dynamic tiering includes a variable service level agreement for power within the datacenter.

2. The method of claim 1 wherein the variable service level agreement enables 1N redundancy to 2N redundancy for power providing equipment.

3. The method of claim 2 wherein the enabling provides incremental redundancy between 1N redundancy and 2N redundancy.

4. The method of claim 1 wherein the power capacity provides for dedicated slices of power availability during prescribed times.

5. The method of claim 1 wherein the power capacity provides for modifying a workload operation after a specified time period.

6. The method of claim 5 wherein the workload is a virtual machine.

7. The method of claim 1 wherein the power capacity provides for on-demand power capacity under specific conditions.

8. The method of claim 1 wherein the modifying enables support for varied application usage within the datacenter.

9. The method of claim 8 wherein the varied application usage is enabled at a service level agreement per application level.

10. The method of claim 1 wherein the modifying allows for modifying a virtual machine operation after a specified time period.

11. The method of claim 10 wherein the modifying includes moving, rescheduling, or powering off the virtual machine.

12. The method of claim 1 wherein the power capacity includes a redundant power capacity value.

13. The method of claim 12 wherein the power capacity includes a set of granular power capacity values.

14. The method of claim 1 further comprising restructuring the power topology based on a variable SLA.

15. The method of claim 1 further comprising determining a second power capacity within the datacenter, wherein the second power capacity enables calculating an additional power requirement metric.

16. The method of claim 15 wherein the additional power requirement metric includes an additional outage time duration requirement.

17. The method of claim 15 wherein the additional power requirement metric includes an additional hold time duration requirement.

18. The method of claim 15 wherein the determining a second power capacity includes a subset of the power capacity within the datacenter.

19. The method of claim 15 wherein the determining a second power capacity includes a portion of the power capacity within the datacenter not included in the determining of the power capacity.

20. The method of claim 1 wherein the determining includes distribution capacity within the datacenter.

21. The method of claim 1 wherein the determining includes rack-level granularity.

22. The method of claim 1 wherein the calculating includes peak shaving.

23. A computer program product embodied in a non-transitory computer readable medium for power management, the computer program product comprising code which causes one or more processors to perform operations of:
determining a power capacity within a datacenter;
evaluating an outage time duration requirement for the power capacity that was determined;
evaluating a hold time duration requirement for the power capacity;
evaluating a number of occurrences of power outage allowed for the power capacity;
calculating a power requirement metric based on the outage time duration requirement, the hold time duration requirement, and the number of occurrences; and
modifying a power topology within the datacenter based on the power requirement metric, wherein the modifying provides for a dynamic tiering of power within the datacenter, wherein the dynamic tiering includes a variable service level agreement for power within the datacenter.

24. A computer system for power management comprising:
a memory which stores instructions;
one or more processors coupled to the memory wherein the one or more processors, when executing the instructions which are stored, are configured to:
determine a power capacity within a datacenter;
evaluate an outage time duration requirement for the power capacity that was determined;
evaluate a hold time duration requirement for the power capacity;
evaluate a number of occurrences of power outage allowed for the power capacity;
calculate a power requirement metric based on the outage time duration requirement, the hold time duration requirement, and the number of occurrences; and
modify a power topology within the datacenter based on the power requirement metric, wherein the modifying provides for a dynamic tiering of power within the datacenter, wherein the dynamic tiering includes a variable service level agreement for power within the datacenter.

* * * * *